Oct. 21, 1969
L. H. SMITH
3,473,366
PRESSURE PULSE GENERATOR
Filed Jan. 4, 1968
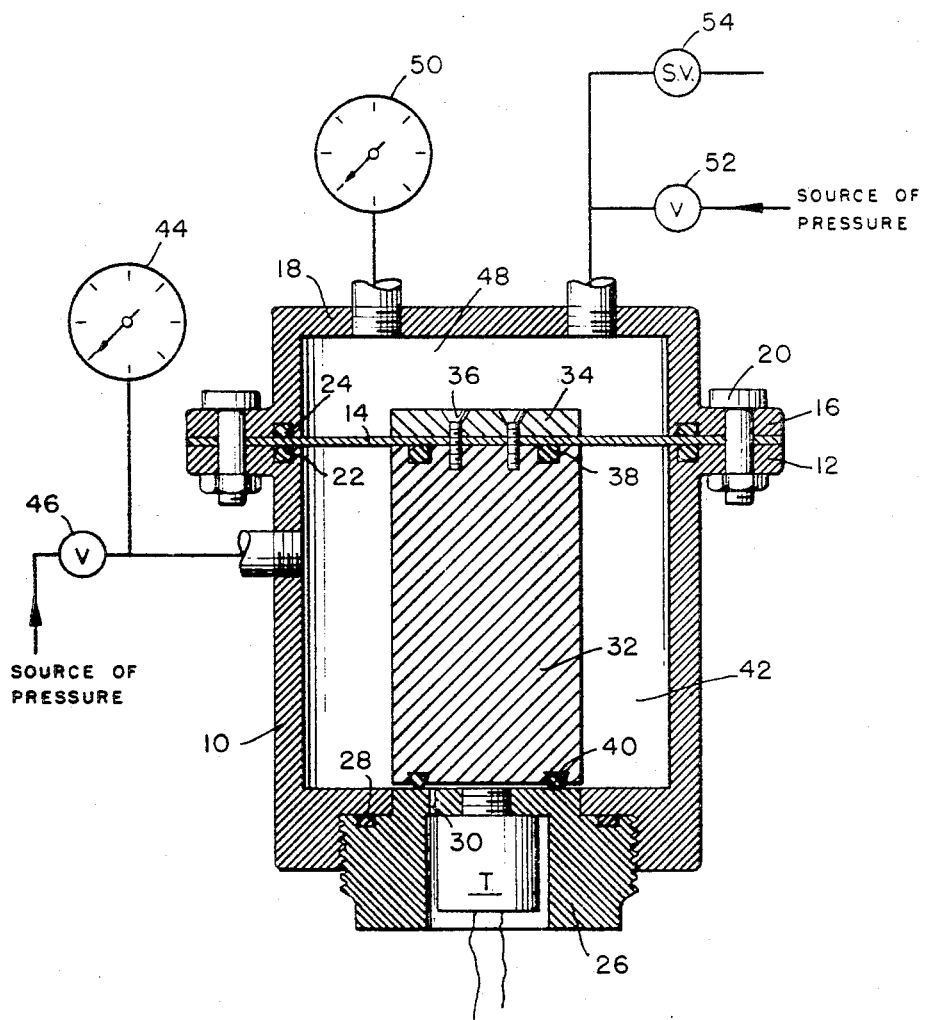
LLOYD H. SMITH
BY
V. C. MULLER
ROY MILLER
ATTORNEYS.

3,473,366
PRESSURE PULSE GENERATOR

Lloyd H. Smith, China Lake, Calif., assignor to the United States of America as represented by the Secretary of the Navy
Filed Jan. 4, 1968, Ser. No. 695,678
Int. Cl. G01l 27/00
U.S. Cl. 73—4            4 Claims

ABSTRACT OF THE DISCLOSURE

Pulse generator which closely simulates the overpressure blast wave associated with an aerosol or gaseous detonation, which is employed to calibrate a transducer. Two chambers, separated by a diaphragm, are pressurized and the pressure of one chamber is applied to the transducer through a valve moveable with the diaphragm when the pressure in one of the chambers is suddenly released. Pressure rise time may be controlled to some extent by choice of the gas.

---

The invention described herein may be manufactured and used by or for the Government of the United States of America for governmental purposes without the payment of any royalties thereon or therefor.

BACKGROUND OF INVENTION

In the design and development of blast type warheads and gaseous and aerosol detonation devices it has become increasingly important to make accurate measurements of the overpressure developed, which has entailed specialized equipment, since the pressure changes may exceed $10^8$ pounds per square inch per second. Pressure transducers are generally employed for this purpose, which convert an input pressure signal to an output electrical signal, the signature of which may be recorded by a suitable electrical system. The electrical property of the transducer may be change in resistance, capacitance, inductance, or the piezoelectric property of a crystal. It may approach a simple oscillator having one natural frequency or may have a combination of frequencies and the response may be either linear or non-linear. The piezoelectric transducer system, in particular, generates a charge when a crystal is distorted which is a function of a pressure force. Since this charge leaks off, it is inherently a transient device, well suited for measuring short duration blast effects. Calibration of a transducer entails the establishment of a known relationship or transfer function between the input function and output function. For a dynamic transfer function, this is normally a complex function of frequency including time constants which may be established by analytical solution of a known equation, or, if the equation is unknown, by observed experimental input and output functions from which frequency response curves may be computed, these then being employed to determine the response for a given input or the input which will produce a certain response.

Transducer calibration requires the application of a known input and precise measurement of the output. Various devices have been employed for this purpose, including a ball bouncing on a diaphragm, quick opening valves, shock tubes, burst diaphragms and explosions. The quick opening valves, which are the most closely related to the present invention, have in general, been too slow in operation for effective frequency calibration. The rise time, for example, of a blast wave may be of the order of 20 to 10 $\mu$sec. and its amplitude as much as a million pounds per square inch near its source which, of course, rapidly attenuates at farther distances.

BRIEF DESCRIPTION OF DRAWING

The single figure is a central longitudinal section, portions being shown diagrammatically.

DESCRIPTION OF PREFERRED EMBODIMENT

The invention comprises a hollow circular casing 10 having a flange 12 at one end which is closed by a diaphragm 14, its edge being disposed between flange 12 and the like flange 16 on cover 18. A plurality of angularly spaced bolts 20 maintain the parts together and O rings 22, 24 prevent leakage around the periphery of the diaphragm. The other end of casing 10 is closed by a threaded insert 26 and sealed with an O ring 28. The insert is centrally threaded to receive a transducer T and a bleed hole 30 is provided to permit a desired drop in pressure on the transducer. Wrench flats or spanner holes may be provided on the insert for rotating it. A piston 32 is secured to the diaphragm by a plate 34 and screws 36 and sealed by an O ring 38. The lower end of the piston carries an O ring 40 which seats on the inner face of insert 26. The annular chamber 42, surrounding the piston, communicates with a pressure gage 44 and a manual valve 46, the latter being connected to a source of gas pressure (not shown). Chamber 48, above the diaphragm, communicates with a pressure gage 50, a manual valve 52, also connected to a source of gas pressure (not shown), and to a solenoid valve 54.

In the operation of the apparatus, chamber 48 is pressurized to a desired value through valve 52, which is then closed. This causes the diaphragm to distort, seating O ring 40 on insert 26 and isolating the transducer from chamber 42. The transducer is now subjected to only the ambient pressure. Valve 46 is next opened, pressuring chamber 42 to a desired value as determined by gage 44. Solenoid valve 54 is next opened which relieves the pressure on the top of the diaphragm which then snaps upward by the pressure in chamber 42, breaking the seal of O ring 40 and subjecting the transducer to the pressure in chamber 42. The response of the transducer to the known pressure in chamber 42 is recorded on an electrometer. As will be apparent, various pressure inputs in chamber 42 may be employed which will provide various response outputs of the transducer.

The rise time of the pressure experienced by the transducer may be controlled to some extent by the choice of gas employed, helium providing the fastest rise time. Nitrogen, however, provides a sufficient rise time for pressures experienced in gaseous and aerosol detonations. The decay time may be controlled by the choice of the size of the bleed off hole. As will be apparent, various inserts may be employed, having different size bleed holes, or different couplings to the transducer, these being interchangeably connectable to the lower casing.

Obviously many modifications and variations of the present invention are possible in the light of the above teachings. It is therefore to be understood that the invention may be practiced otherwise than as specifically described.

What is claimed is:
1. Apparatus for applying a short duration pressure pulse, simulating a detonation wave, to a transducer, for calibrating same, comprising;
   (a) a tubular casing closed at one end by a flexible diaphragm extending thereacross,
   (b) a piston secured to the diaphragm and extending from one side of same into the casing, forming an annular first chamber between the piston and casing,
   (c) a closure at the other end of the casing having a central aperture adapted to carry a transducer and communicating with said first chamber,
   (d) valve means providing an annular seal between the other end of said piston and said closure,

(e) means forming a second chamber disposed adjacent the diaphragm at its opposite side for pressurizing said opposite side of the diaphragm, and for moving the piston into sealing engagement with said closure, thereby isolating said transducer from said first chamber, (f) means for applying gas pressure to said second chamber for closing said valve means, (g) a quick acting valve for rapidly releasing pressure from said second chamber, and (h) means for pressuring said first chamber to a desired reference value, (i) the construction and arrangement being such that when said quick acting valve is opened, pressure in said second chamber rapidly decays, causing pressure in said first chamber to move the diaphragm and rapidly apply the pressure in said first chamber to the transducer.

2. Apparatus in accordance with claim 1 wherein said annular seal includes an O ring adapted to seat on a flat surface on said closure.

3. Apparatus in accordance with claim 2 including a bleed port disposed between the O ring and said central aperture, communicating with ambient pressure.

4. Apparatus in accordance with claim 3 including other closures interchangeably connectable to the tubular casing having various size bleed ports, whereby pressure decay time may be selected.

References Cited
UNITED STATES PATENTS

| | | | |
|---|---|---|---|
| 585,883 | 7/1897 | Bosworth | 73—4 |
| 2,539,418 | 1/1951 | Grogan | 73—4 |
| 2,565,086 | 8/1951 | Peterson | 73—4 XR |

LOUIS R. PRINCE, Primary Examiner

H. C. POST III, Assistant Examiner

U.S. Cl. X.R.

73—12